United States Patent
Fedorak et al.

(10) Patent No.: US 10,993,576 B2
(45) Date of Patent: May 4, 2021

(54) BEVERAGE MACHINE AND CAPSULE FOR USE WITH THE BEVERAGE MACHINE

(71) Applicant: BARTESIAN INC., Kitchener (CA)

(72) Inventors: Bryan Neil Stephen Fedorak, Waterloo (CA); Jason Neevel, Kitchener (CA); Kristopher Christensen, Oakville (CA); Jacob Edding, East York (CA); Art de Guzman, Toronto (CA); Nicol Alexander Boyd, Kennedy Town (HK); Tomas Wilhelm Rosén, Lidingö (SE)

(73) Assignee: BARTESIAN INC., Kitchener (CA)

( * ) Notice: Subject to any disclaimer, the term of this patent is extended or adjusted under 35 U.S.C. 154(b) by 230 days.

(21) Appl. No.: 16/080,520

(22) PCT Filed: Mar. 1, 2017

(86) PCT No.: PCT/IB2017/051205
§ 371 (c)(1),
(2) Date: Aug. 28, 2018

(87) PCT Pub. No.: WO2017/149479
PCT Pub. Date: Sep. 8, 2017

(65) Prior Publication Data
US 2019/0059636 A1  Feb. 28, 2019

Related U.S. Application Data

(60) Provisional application No. 62/301,895, filed on Mar. 1, 2016.

(51) Int. Cl.
*A47J 31/40* (2006.01)
*A47J 31/36* (2006.01)
(Continued)

(52) U.S. Cl.
CPC .......... *A47J 31/407* (2013.01); *A47J 31/405* (2013.01); *A47J 31/5255* (2018.08); *B65D 85/8043* (2013.01)

(58) Field of Classification Search
CPC ........ A47J 31/407; A47J 31/3676–3695; A47J 31/3623–3661; A47J 31/0642–0689; B65D 85/8043–8049
See application file for complete search history.

(56) References Cited

U.S. PATENT DOCUMENTS

D339,028 S     9/1993  Bannigan
5,347,916 A *  9/1994  Fond .................. A47J 31/0668
                                                99/295
(Continued)

FOREIGN PATENT DOCUMENTS

CA    2756426 A1    10/2010
CA    2871082 A1    11/2013
(Continued)

OTHER PUBLICATIONS

EPO, Extended European Search Report, dated Feb. 13, 2020 re European Patent Application No. 17759356.3.
(Continued)

*Primary Examiner* — Michael A LaFlame, Jr.
(74) *Attorney, Agent, or Firm* — Perry + Currier

(57) ABSTRACT

The present disclosure relates to a beverage machine for preparing a single serving of a mixed beverage and a capsule for use with the machine. The capsule includes an open shell defining a reservoir for holding ingredients; a lid for sealing the open shell; and, a guide member disposed within the reservoir of the open shell configured to receive a liquid stream injected by an injection needle of a beverage machine when the lid is pierced by the injection needle and to guide the liquid stream to a mixing zone within the reservoir for mixing the liquid stream with the liquid held in the reservoir
(Continued)

to prepare a single serving of mixed beverage to be dispensed from the reservoir via a dispensing needle of the beverage machine when the dispensing needle pierces the open shell . . . .

17 Claims, 14 Drawing Sheets

(51) Int. Cl.
    *B65D 85/804*     (2006.01)
    *A47J 31/52*     (2006.01)

(56) References Cited

U.S. PATENT DOCUMENTS

| | | |
|---|---|---|
| D428,986 S | 8/2000 | Dye |
| 6,584,502 B1 | 6/2003 | Natarajan et al. |
| 6,832,542 B2 | 12/2004 | Hu et al. |
| D513,152 S | 12/2005 | Cahen |
| D552,402 S | 10/2007 | Schwamkrug |
| D560,950 S | 2/2008 | Schwamkrug |
| 7,412,921 B2 | 8/2008 | Hu et al. |
| 7,543,527 B2 | 6/2009 | Schmed |
| D596,442 S | 7/2009 | Cahen |
| 7,565,860 B1 | 7/2009 | Liu |
| D600,967 S | 9/2009 | Cahen |
| D602,303 S | 10/2009 | Cahen |
| 7,604,826 B2 | 10/2009 | Denisart et al. |
| 7,640,843 B2 | 1/2010 | Halliday et al. |
| 8,062,682 B2 | 11/2011 | Mandralis et al. |
| 8,168,247 B2 | 5/2012 | Halliday et al. |
| D662,644 S | 6/2012 | Wauters |
| 8,220,382 B2 | 7/2012 | Verbeek |
| 8,307,754 B2 | 11/2012 | Ternité et al. |
| 8,402,883 B2 | 3/2013 | Kollep et al. |
| 8,475,860 B2 | 7/2013 | Colantonio et al. |
| D690,150 S | 9/2013 | Cahen |
| D696,888 S | 1/2014 | Cahen |
| 8,635,945 B2 | 1/2014 | Verbeek |
| 8,703,219 B2 | 4/2014 | Doleac et al. |
| 8,808,775 B2 | 8/2014 | Novak et al. |
| 8,852,659 B2 | 10/2014 | Halliday et al. |
| D718,972 S | 12/2014 | Jorgensen |
| 8,906,436 B2 | 12/2014 | Nowak |
| 8,962,049 B2 | 2/2015 | Doleac et al. |
| D724,369 S | 3/2015 | Cahen |
| D726,478 S | 4/2015 | Cahen |
| D726,482 S | 4/2015 | Cahen |
| 8,999,421 B2 | 4/2015 | Clark |
| D728,481 S | 5/2015 | Schulte |
| D728,987 S | 5/2015 | Cahen |
| D728,988 S | 5/2015 | Warburton |
| D731,223 S | 6/2015 | Hatherell |
| 9,120,617 B2 | 9/2015 | Beer |
| D742,679 S | 11/2015 | Bartoli et al. |
| 9,295,278 B2 | 3/2016 | Nowak |
| 9,320,382 B2 | 4/2016 | Lo Faro et al. |
| 9,352,287 B2 | 5/2016 | Snider et al. |
| 9,357,870 B2 | 6/2016 | Doleac et al. |
| 9,371,174 B2 | 6/2016 | Wong et al. |
| 9,371,175 B2 | 6/2016 | Dogan et al. |
| 9,371,176 B2 | 6/2016 | Kohli et al. |
| D760,530 S | 7/2016 | Bartoli et al. |
| D761,051 S | 7/2016 | Bartoli et al. |
| 9,428,328 B2 | 8/2016 | Trombetta et al. |
| 9,469,471 B2 | 10/2016 | Dran et al. |
| D771,993 S | 11/2016 | Cai et al. |
| D800,487 S | 10/2017 | Chawla et al. |
| D800,497 S | 10/2017 | Fedorak et al. |
| D830,756 S | 10/2018 | Cahen |
| 2004/0208186 A1 | 10/2004 | Eichen et al. |
| 2006/0121174 A1* | 6/2006 | Franke .............. A23L 23/10 426/611 |
| 2009/0311384 A1* | 12/2009 | MacMahon ........ B65D 85/8043 426/78 |
| 2010/0288132 A1 | 11/2010 | Gavillet et al. |
| 2011/0045144 A1 | 2/2011 | Boussemart et al. |
| 2011/0271844 A1* | 11/2011 | Mariller ............ B65D 85/8043 99/295 |
| 2012/0052159 A1 | 3/2012 | Doleac et al. |
| 2012/0199227 A1 | 8/2012 | Manser et al. |
| 2012/0231126 A1 | 9/2012 | Lo Faro et al. |
| 2013/0129870 A1 | 5/2013 | Novak et al. |
| 2013/0189400 A1 | 7/2013 | Pribus et al. |
| 2013/0236609 A1 | 9/2013 | Magniet et al. |
| 2013/0247774 A1 | 9/2013 | MacChiavelli et al. |
| 2014/0026761 A1 | 1/2014 | Bartoli et al. |
| 2014/0053735 A1 | 2/2014 | Verbeek |
| 2014/0137747 A1 | 5/2014 | Verbeek |
| 2014/0141133 A1 | 5/2014 | Halliday et al. |
| 2014/0326144 A1 | 11/2014 | Novak et al. |
| 2014/0326361 A1 | 11/2014 | Larzul et al. |
| 2014/0328980 A1 | 11/2014 | Novak et al. |
| 2014/0331867 A1 | 11/2014 | Novak et al. |
| 2014/0331868 A1 | 11/2014 | Novak et al. |
| 2014/0335239 A1 | 11/2014 | Novak et al. |
| 2014/0338542 A1 | 11/2014 | Smith et al. |
| 2014/0373722 A1* | 12/2014 | Talon ................ A47J 31/3623 99/280 |
| 2015/0034127 A1 | 2/2015 | Talon et al. |
| 2015/0056331 A1 | 2/2015 | Rivera |
| 2015/0056352 A1 | 2/2015 | Dogan et al. |
| 2015/0072053 A1 | 3/2015 | Dogan et al. |
| 2015/0079240 A1 | 3/2015 | Lo Foro et al. |
| 2015/0125576 A1 | 5/2015 | Dogan |
| 2015/0135965 A1 | 5/2015 | Lo Foro et al. |
| 2015/0140182 A1 | 5/2015 | Dogan et al. |
| 2015/0144001 A1 | 5/2015 | Lo Foro et al. |
| 2015/0147448 A1 | 5/2015 | Lo Foro et al. |
| 2015/0166258 A1 | 6/2015 | Gruder |
| 2015/0307266 A1 | 10/2015 | Zanetti |
| 2015/0368033 A1 | 12/2015 | Krug et al. |
| 2016/0051080 A1 | 2/2016 | Lo Faro et al. |
| 2016/0137401 A1 | 5/2016 | Heydel et al. |
| 2016/0255990 A1 | 9/2016 | Bartoli et al. |
| 2017/0119198 A1* | 5/2017 | Barber .............. A47J 31/0642 |

FOREIGN PATENT DOCUMENTS

| | | |
|---|---|---|
| CA | 2895646 A1 | 7/2014 |
| CA | 2894436 A1 | 12/2015 |
| CN | 104010949 A | 8/2014 |
| CN | 104302559 A | 1/2015 |
| CN | 104955744 A | 9/2015 |
| WO | WO-2013132450 A1 | 9/2013 |
| WO | WO-2014102702 A1 | 7/2014 |
| WO | WO-2015189689 A3 | 12/2015 |

OTHER PUBLICATIONS

SIPO, First Office Action [with English translation], dated Aug. 16, 2019, re China Patent Application No. 201780014373.6.
International Search Report dated Jun. 15, 2017 for PCT International Application No. PCT/IB2017/051205.
Written Opinion of the International Searching Authority dated Jun. 15, 2017 for PCT International Application No. PCT/IB2017/051205.
WIPO/IB, International Preliminary Report on Patentability (Ch 1), Sep. 4, 2018, re PCT International Patent Application No. PCT/IB2017/051205.
USPTO, Notice of Allowance and Fee(s) Due, dated Nov. 2, 2016, re Design U.S. Appl. No. 29/617,245.

* cited by examiner

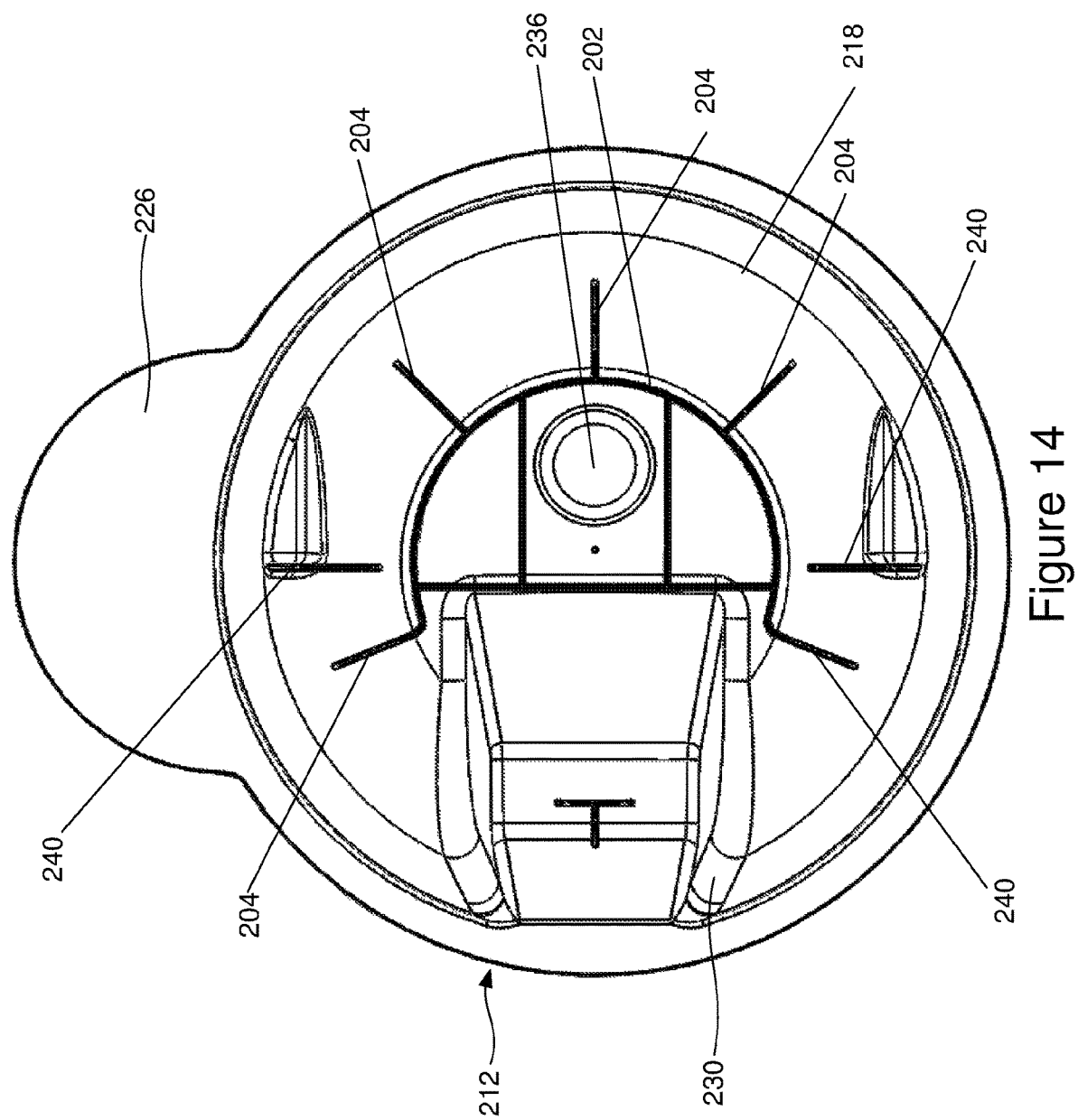

BEVERAGE MACHINE AND CAPSULE FOR USE WITH THE BEVERAGE MACHINE

FIELD

The present disclosure relates to beverage machines and capsules. More particularly, the present disclosure relates to a beverage machine for preparing a single serving of a mixed beverage and a capsule for use with the machine.

BACKGROUND

Various machines have been developed in recent years that enable consumers to quickly prepare a single serving of a hot beverage, such as coffee, tea, soup, or hot chocolate. Such machines use capsules that generally include two chambers: a first chamber that includes a filter with dry, crystallized ingredients and a second chamber for receiving the prepared beverage. When preparing a single cup of a beverage, these machines provide a stream of heated liquid to the first chamber of the capsule. The dry crystallized ingredients within the first chamber capsule dissolve in the liquid stream and the liquid stream is filtered as the liquid stream flows into the second chamber.

Conventional beverage machines and capsules are generally not suitable for preparing a single serving of a mixed beverage (e.g. a single serving of a mixed drink comprising alcohol or juices and water) because conventional machines and capsules generally produce a beverage that lacks the quality, flavour, aesthetic, and consistency required for mixed beverages.

SUMMARY

The present disclosure relates to a beverage machine for preparing a single serving of a mixed beverage and a capsule for use with the beverage machine.

According to an aspect of an embodiment, a capsule for use in a beverage machine comprising: A capsule for use in a beverage machine, the capsule comprising: an open shell defining a reservoir for holding a liquid comprising one or more ingredients; a lid for sealing the open shell; and, a guide member disposed within the reservoir of the open shell configured to receive a liquid stream injected by an injection needle of a beverage machine when the lid is pierced by the injection needle and to guide the liquid stream to a mixing zone within the reservoir for mixing the liquid stream with the liquid held in the reservoir to prepare a single serving of mixed beverage to be dispensed from the reservoir via a dispensing needle of the beverage machine when the dispensing needle pierces the open shell.

The guide member may also include one or more vanes disposed at a bottom of the shell for guiding the liquid stream toward the mixing zone within the reservoir.

The channel may be a closed channel.

The open shell may include a sidewall and the channel may follow a slope of the sidewall, wherein the channel comprising an inlet for receiving the liquid stream when the liquid stream is injected by the injection needle and an outlet for guiding the liquid stream towards the mixing zone.

The inlet and the outlet of the channel may be radially offset.

The inlet of the channel may have a first width and the outlet may have a second width less than the second width to increase a velocity of a flow of the liquid stream through channel.

The inlet of the channel may have a first width and the outlet may have a second width greater than the second width.

The channel may include an air relief aperture proximate the inlet of the channel.

A bottom of the open shell may include locating members for locating the inlet of the channel relative to injection needle when the capsule inserted into a beverage capsule receptacle of the beverage machine.

The locating members may comprise a pair of diametrically opposed fins for locating the inlet relative to injection needle when the capsule is inserted into the beverage capsule receptacle of the beverage machine.

The open shell may have a generally concave geometry for nesting the capsule within another capsule.

The open shell may be manufactured from a recyclable material.

The recyclable material may be selected from a member of the group consisting of polyethylene terephthalate (PET), polypropylene (PP), polystyrene (PS), and aluminum.

A bottom of the shell may include a weakened portion located at the mixing zone, the weakened portion pierceable by the dispensing needle of the beverage machine.

The weakened portion may be scored to facilitate piercing by the dispensing needle of the beverage machine.

The weakened portion may have a thickness less than a thickness of the bottom of the open shell to facilitate piercing by the dispensing needle of the beverage machine.

According to an aspect of an embodiment, a beverage machine for preparing a single serving of a mixed beverage. The beverage machine comprises: one or more containers, each container configured to hold a liquid; a water container configured to hold water; a plumbing system configured to provide a liquid stream comprising liquid from at least one of the one or more containers and water from the water container to the injection needle; a beverage capsule receptacle configured to receive and retain a capsule as described above; an injection needle for piecing the lid of the capsule and for injecting the liquid stream into the beverage capsule for preparing the single serving of the mixed beverage; and, a dispensing needle for piercing a bottom of the capsule to dispense the mixed beverage from the beverage capsule.

The beverage machine can also include flow rate sensor configured to measure an amount of the liquid stream provided by the plumbing system.

BRIEF DESCRIPTION OF THE DRAWINGS

Preferred embodiments of the present invention will now be described, by way of example only, with reference to the drawings and to the following description, in which:

FIG. 14 is a bottom view of the capsule of FIG. 14.

DETAILED DESCRIPTION OF THE INVENTION

Figure 1:
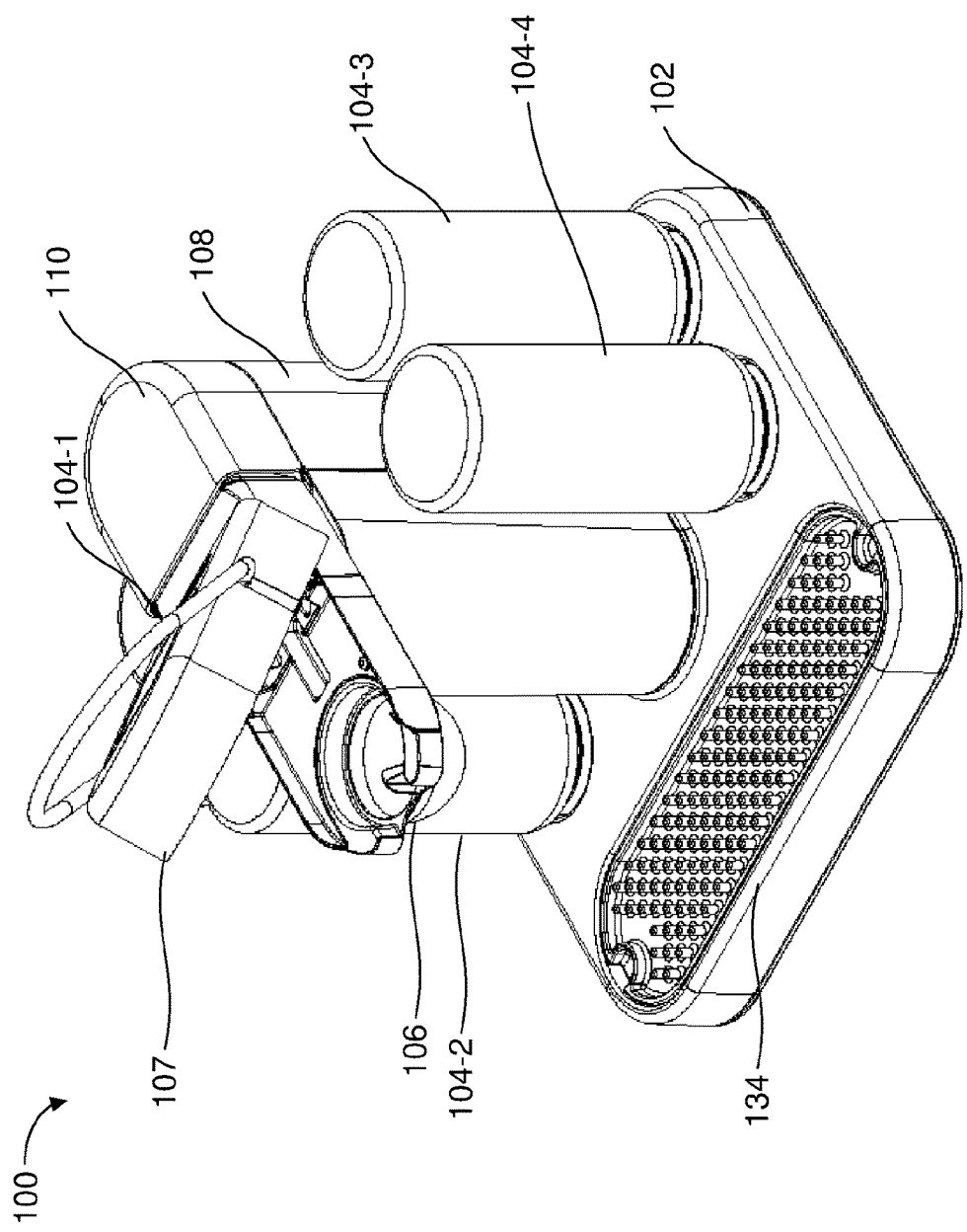
FIG. 1 is a perspective view of a beverage machine in accordance with a non-limiting embodiment of the disclosure.
Figure 2:
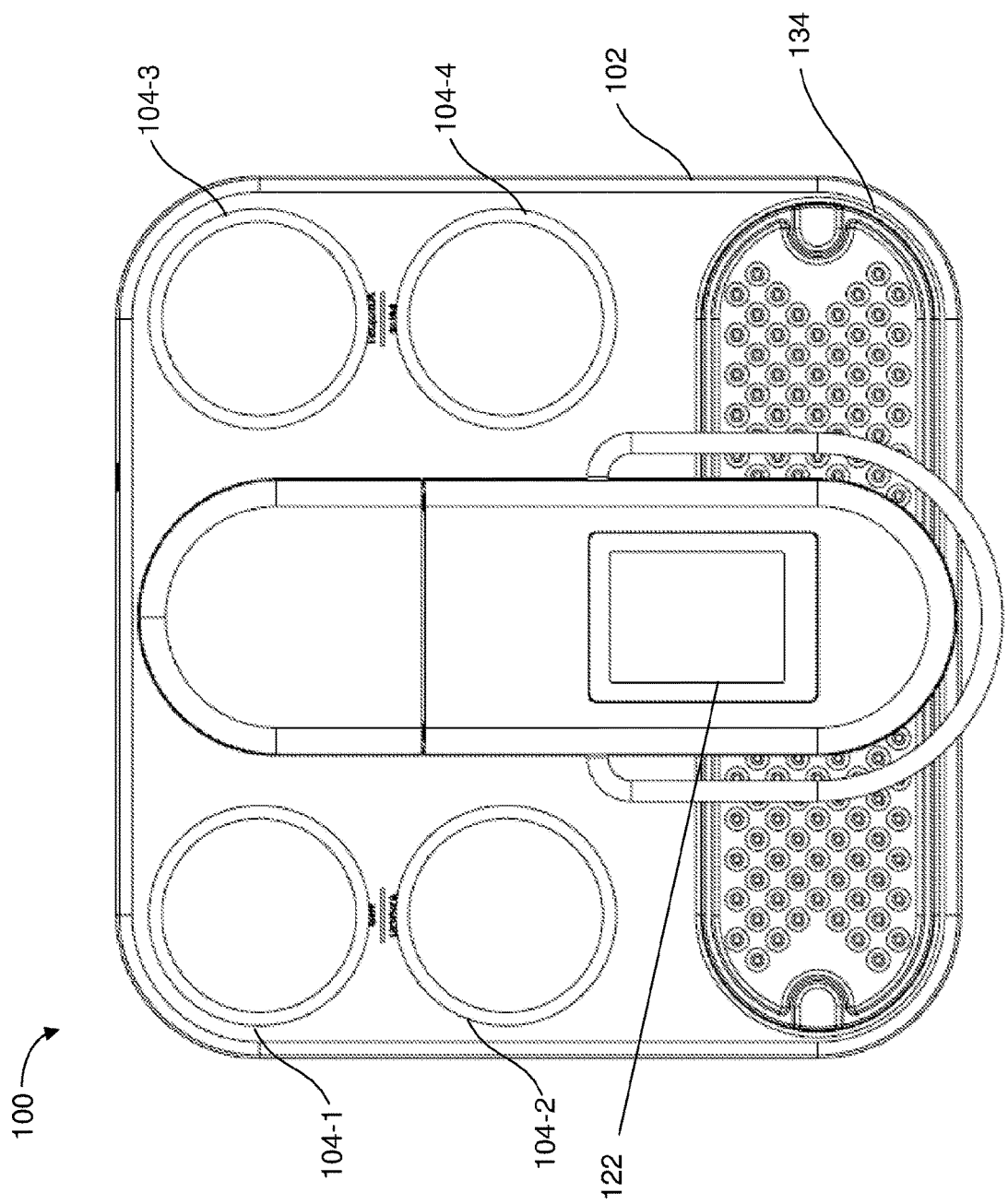
FIG. 2 is a top view of the beverage machine of FIG. 1.
Figure 3:
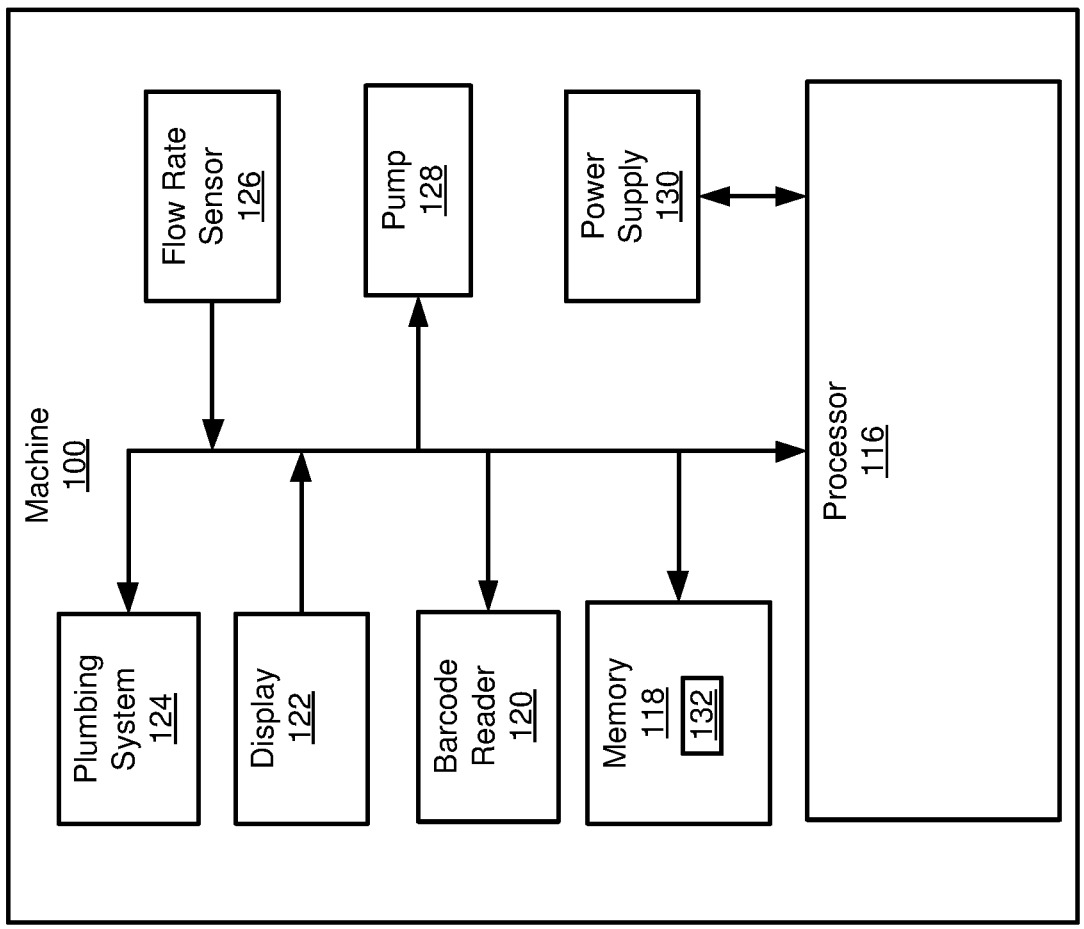
FIG. 3 is a schematic block diagram of internal components of the beverage machine of FIG. 1.
Figure 4:
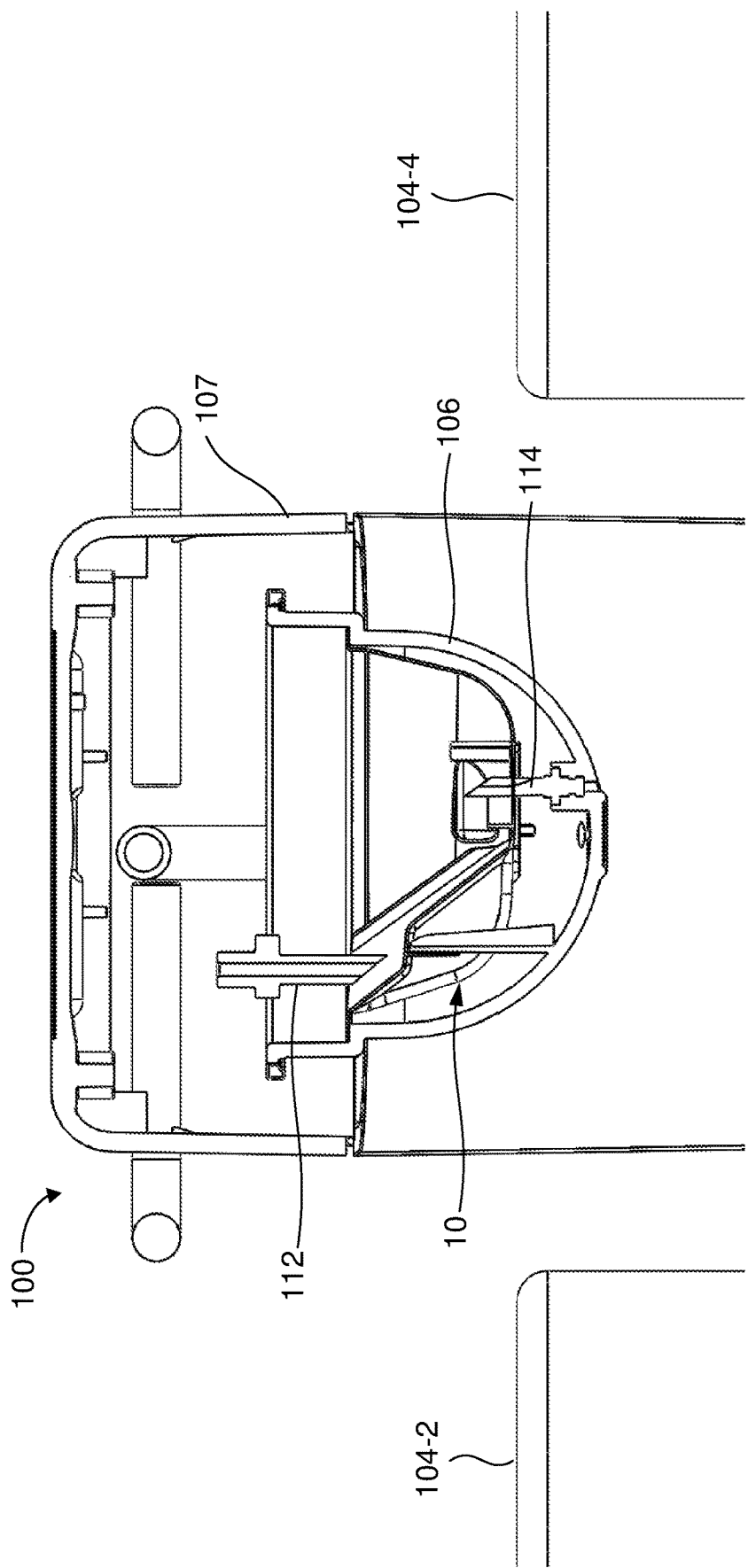
FIG. 4 is a partial cut away front view depicting a portion of the beverage machine of FIG. 1.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In this disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The present disclosure generally relates to a beverage machine for preparing a single serving of a mixed beverage and a capsule for use with the beverage machine. For the purposes of the present disclosure, the term "mixed beverage" refers to a beverage that is prepared by mixing a liquid stream, water, and a liquid comprising one or more ingredients together. Liquid stream can include any suitable liquid required to prepare a single serving of a mixed beverage including alcohols when preparing a single severing of a mixed alcoholic beverage (e.g. a mixed drink) or juices when preparing a single serving of a mixed beverage.

Attention is directed to FIG. 1 to FIG. 6, which depicts a beverage machine 100 (referred to hereinafter as machine 100) for preparing a single serving of a mixed beverage according to a non-limiting embodiment. Machine 100 includes: a base 102; four containers 104-1, 104-2, 104-3, 104-4 (referred to hereinafter individually as container 104 and collectively as containers 104) disposed on base 102; a beverage capsule receptacle 106 shaped and dimensioned to receive a capsule 10 (see FIG. 7 to FIG. 11) or a capsule 210 (see FIG. 13 and FIG. 14); a machine lid 107 configured to open to provide access to beverage capsule receptacle 106 for insertion of a capsule 10 and close to begin operation of machine 100; a water container 108 configured to hold water; a removable water container lid 110 configured to cover the water container 108; an injection needle 112 (see FIG. 4) configured to inject a liquid stream comprising liquid from one or more of containers 104 and water from water container 108 into capsule 10 to prepare a single serving of a mixed beverage; and a dispensing needle 114 (see FIG. 4) configured to dispense the single serving of the mixed beverage from capsule 10.

Machine 100 also include internal multiple components, such as a processor 116 that controls the overall operation of machine 100. Processor 116 is coupled to and interacts with other internal components of machine 100, including a memory 118, a barcode reader 120, a display 122, a plumbing system 124, a flow rate sensor 126, a pump 128, and a power supply 130.

Processor 116 may be implemented as a plurality of processors, including but not limited to, one or more central processors (CPUs)). Processor 116 is configured to communicate with memory 118 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of machine 100 as described herein are typically maintained, persistently, in memory 118 and used by processor 116 which makes appropriate utilization of volatile storage during the execution of such programming instructions. Those skilled in the art will now recognize that memory 118 is an example of computer readable media that can store programming instructions executable on processor 116. Furthermore, memory 118 is also an example of a memory unit and/or memory device.

Machine 100 also includes a software program, application, or firmware 132 that control operations of machine 100 for preparing a single serving of a mixed beverage. Software program, application, or firmware 132 is executed by processor 116. Those skilled in the art will appreciate that portions of software program, application, or firmware 132 may be temporarily loaded into volatile storage unit of memory 118.

Processor 116 is configured to interact with barcode reader 120. Barcode reader 120 is configured to read a barcode printed on capsule 10. Processor 116 is configured to receive barcode data representing the barcode read by barcode reader 120 and decode the barcode data to obtain the recipe for preparing a mixed beverage as described in further detail below.

Processor 116 is also configured to interact with display 122, which comprises any suitable one of, or combination of, a flat panel display (e.g. LCD (liquid crystal display), a plasma display, LED (light emitting diode), display (OLED (organic light emitting diode) displays, a touch-sensitive display such as capacitive, resistive, infrared, surface acoustic wave (SAW) display, optical touchscreen display, and the like. Processor 116 interacts with display 122 to render on display 122 a graphical user interface (GUI) that includes selectable options in which each selectable option is associated with an amount of alcohol to be included in the mixed beverage. In some embodiments, display 122 renders four selectable options in the GUI labelled "virgin", "light", "regular", and "strong". The selectable option labelled "virgin" is associated with no alcohol to be included in the mixed beverage (e.g. the mixed beverage is prepared using only water and a liquid comprising one or more ingredients); the selectable option labelled "light" is associated with one ounce of alcohol to be included in the mixed beverage; the selectable option labelled "regular" is associated with one and a half ounces of alcohol to be included in the mixed beverage; and the selectable option labelled "strong" is associated with two ounces of alcohol to be included in the mixed beverage. It will be appreciated that although the labels described refer to an amount of alcohol to be included in the mixed beverage, in other embodiments, the labels "light", "regular", and "strong" can be associated with different amounts alcohol. Also, in some other embodiments, the labels can be associated with an amount of some other type of liquid to be included in the mixed beverage. For example, when machine 100 is used to prepare a beverage comprising different types of juices to be mixed together to prepare a single serving of a mixed beverage, each label may be associated with an amount of a juice to be included in a "regular" size the mixed beverage.

Processor 116 is also configured to interact with plumbing system 124 for providing a liquid stream comprising one or more liquids (e.g. alcohols) from containers 104 and water from water container 108 to injection needle 112, as described in further detail below.

Processor 116 is also configured to interact with flow rate sensor 126. Flow rate sensor 126 is configured to measure a flow rate of the liquid stream and a volume of the liquid stream as the liquid stream provided by plumbing system 124 pass through the flow rate sensor 126 into pump 128 and injection needle 112.

Processor 116 is also configured to interact with pump 128. Pump 128 is any suitable pump configured to force the liquid stream provided by the plumbing system 124 into the injection needle 112.

Processor 116 is further configured to interact with power supply 130. Power supply 130 powers components of machine 100 including, but not limited to processor 116, memory 118, barcode reader 120, display 122, plumbing system 124, flow rate sensor 126, and pump 128. Power supply 130 may include a connection to a mains power supply and/or a power adaptor (e.g. and AC-to-DC (alternating current to direct current) adaptor). Alternatively, power supply 130 may include, a battery, a power pack, and the like.

In the example embodiment shown in FIG. 1 to FIG. 6, base 102 of machine 100 includes a platform 134 upon which a beverage container (not shown), may be placed to receive a mixed beverage prepared by machine 100 and dispensed from machine 100 via dispensing needle 114 as described in further detail below. Platform 134 can be configured to collect liquid dispense from the dispensing needle 114 when machine 100 is preparing a mixed beverage. Platform 134 can be removable from base 102 to dispose of liquid that collects within platform 134.

Also, in the example embodiment shown in FIG. 1 to FIG. 6, machine 100 also includes four containers 104. Each container 104 is configured to hold a different liquid, such as, for example, a different alcohol. Examples of alcohols include, but are not limited to, vodka, rum, gin, tequila, whiskey, vermouth, and the like. It will be appreciated that although machine 100 in the example embodiment shown in FIG. 1 to FIG. 6 includes four containers 104, machine 100 may include any number of containers 104. For example, in some embodiments, machine 100 includes a single container 104 for a holding a single alcohol. In other embodiments, machine 100 includes two containers 104 for holding two different alcohols. In still other embodiments, machine 100 includes more than four containers 104 and each container 104 holds a different type of alcohol. In each of these embodiments, machine 100 is configured to prepare a single serving of a mixed beverage as described in further detail below.

It will also be appreciated that although base 102 of machine 100 in the example embodiment shown in FIGS. 1 to 6 includes platform 134, in alternative embodiments, platform 134 may be omitted from machine 100 and a beverage container (not shown) may be placed on directly on a surface, such as, for example, a table, a counter, and the like, at a position below dispensing needle 114 to receive the single serving of the mixed beverage being dispensed from the dispensing needle 114.

Figure 5:
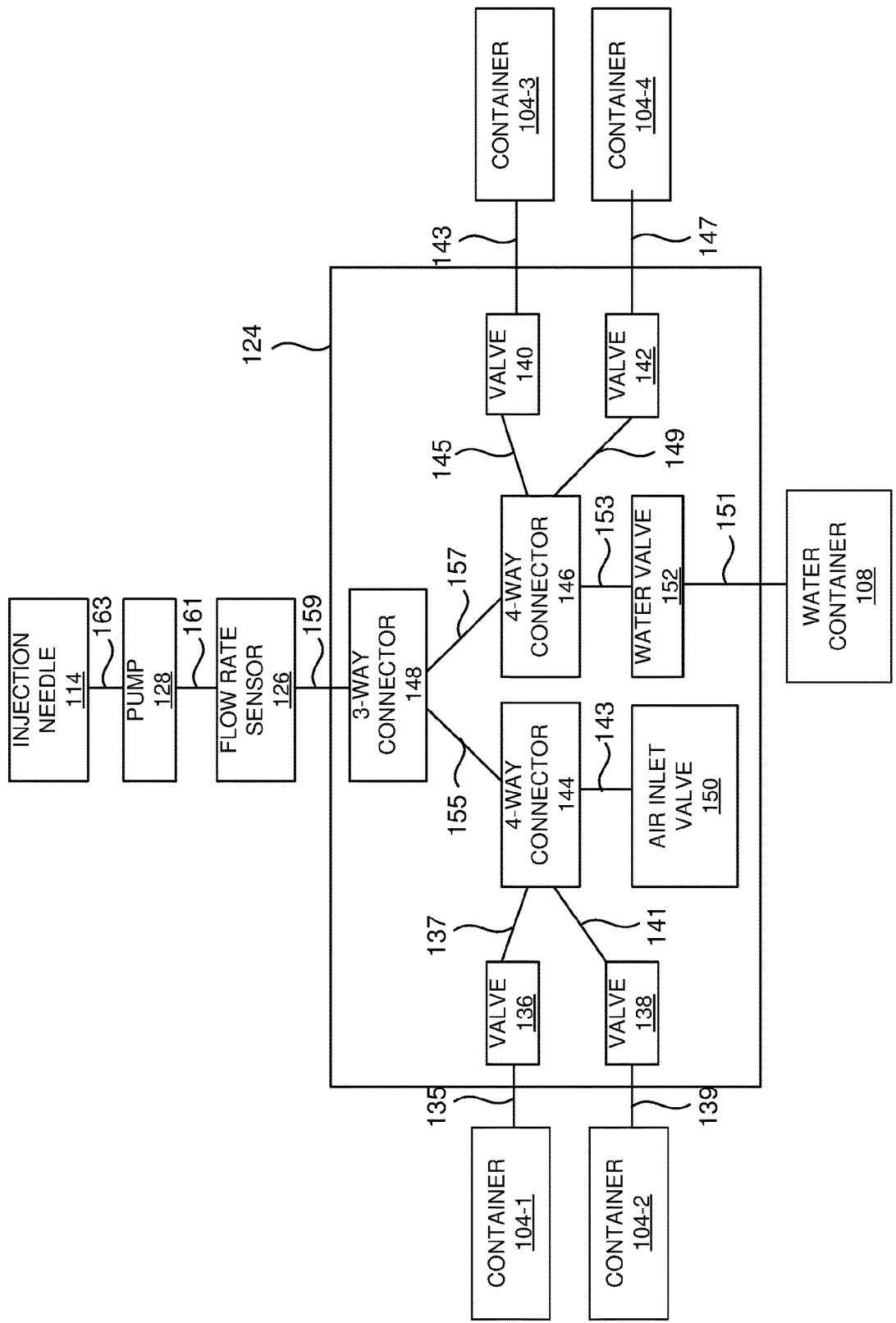
FIG. 5 is a schematic block diagram of a plumbing system of the beverage machine of FIG. 1.

Attention is now directed to FIG. 5, which depicts a non-limiting embodiment of plumbing system 124 of machine 100. Plumbing system 124 includes four valves 136, 138, 140, 142, two 4-way connectors 144, 146, a 3-way connector 148, an air inlet valve 150, a water valve 152. Container 104-1 is connected to 4-way connector 144 via tube 135, valve 136 and tube 137. Container 104-2 is connected to 4-way connector 144 via tube 139, valve 138, and tubes 141. Air inlet valve 150 is also connected to 4-way connector 144 via air tube 143. Air inlet valve 150 is configured to allow air to flow into 4-way connector 144 when opened. Container 104-3 is connected to 4-way connector 146 via tube 143, valve 140, and tube 145. Container 104-4 is connected to 4-way connector 146 via tube 147, valve 142, and tubes 149. Water container 108 is connected to 4-way connector 146 via tube 151, water valve 152, and tube 153. 4-way connectors 144 is connected to 3-way connector 148 via tube 155 and 4-way connector 148 is connected to 3-way connector 148 via tube 157. 3-way connector 148 is connected injection needle 112 via tube 159, flow rate sensor 126, tube 161, pump 128, and tube 163. Tubes 135, 137, 139, 141, 143, 145, 147, 149, 151, 153, 155, 157, 159, 161, and 163 each have a diameter to facilitate a flow of a liquid stream comprising liquid from one or more of containers 104 into injection needle 112.

Processor 116 communicates with plumbing system 124 to open and close each valve 136, 138, 140, 142, air inlet valve 150, and water 152 as required when machine 100 prepare a single serving of a mixed beverage.

Although plumbing system 124 includes two 4-way connectors 144, 146, and one 3-way connector 148, in some embodiments, a six-way connector may be utilized instead of two 4-way connectors 144, 146 and 3-way connector 148.

Attention is now directed to FIGS. 7 to 11, which depicts a capsule 10 for use with machine 100 in accordance with a non-limiting embodiment. Capsule 10 is shaped and sized for use with machine 100. Shell 12 has an open top, a bottom 18, and a sidewall 20 extending from bottom 18 to a peripheral rim 22 surrounding the open top of shell 12. Bottom 18, sidewall 20 of shell 12 and peripheral rim 22 define a reservoir 24 which holds a liquid that includes one or more ingredients (not shown) that are used in preparing a single serving of a mixed beverage. Examples of ingredients, include, but are not limited to, liquid juice concentrates (e.g. lemon, lime, pink grapefruit, strawberry, pineapple), cane sugar, natural flavours, tonic water, soda water, bitters, muddled mint and other leaves, cream, egg, spices, syrups, sugar, salt, extracts, liqueurs, and the like). For the purposes of the present disclosure, the liquid held in reservoir 24 of capsule 10 that includes one or more ingredients is referred to hereinafter as "liquid ingredients".

In the example embodiment shown in FIGS. 7 to 11, shell 12 has a generally concave shape to facilitate nesting or stacking multiple capsules 10 during manufacturing before capsule is filled with ingredients and sealed (or alternatively when lid 14 is removed and capsule 10 has been used to make a single serving of a mixed beverage). Also, in the example embodiment shown in FIGS. 7 to 11, capsule 10 is manufactured from any suitable recyclable material, such as, for example, polyethylene, polyethylene terephthalate (PET), polypropylene (PP), polystyrene (PS), and aluminum.

Peripherical rim 22 includes a flange 23 (shown in FIGS. 7 and 8) and a tab 26 (shown in FIGS. 7 and 8) that is integrally formed with a portion of peripheral rim 22 and extends radially in a direction away from sidewall 20 of shell 12. Tab 26 facilitates grasping and holding of capsule 10 by a user when placing capsule 10 into beverage capsule receptacle 106 of machine 100. Tab 26 also facilitates insertion of capsule 10 into the beverage capsule receptacle 106 by orienting capsule 10 so that tab 26 is placed into a complementary cut-out 154 (see FIG. 6) of beverage capsule receptacle 106 when inserted into beverage capsule receptacle 106. It will be appreciated that in alternative embodiments, capsule 10 may not include flange 23 and/or tab 26.

Figure 7:
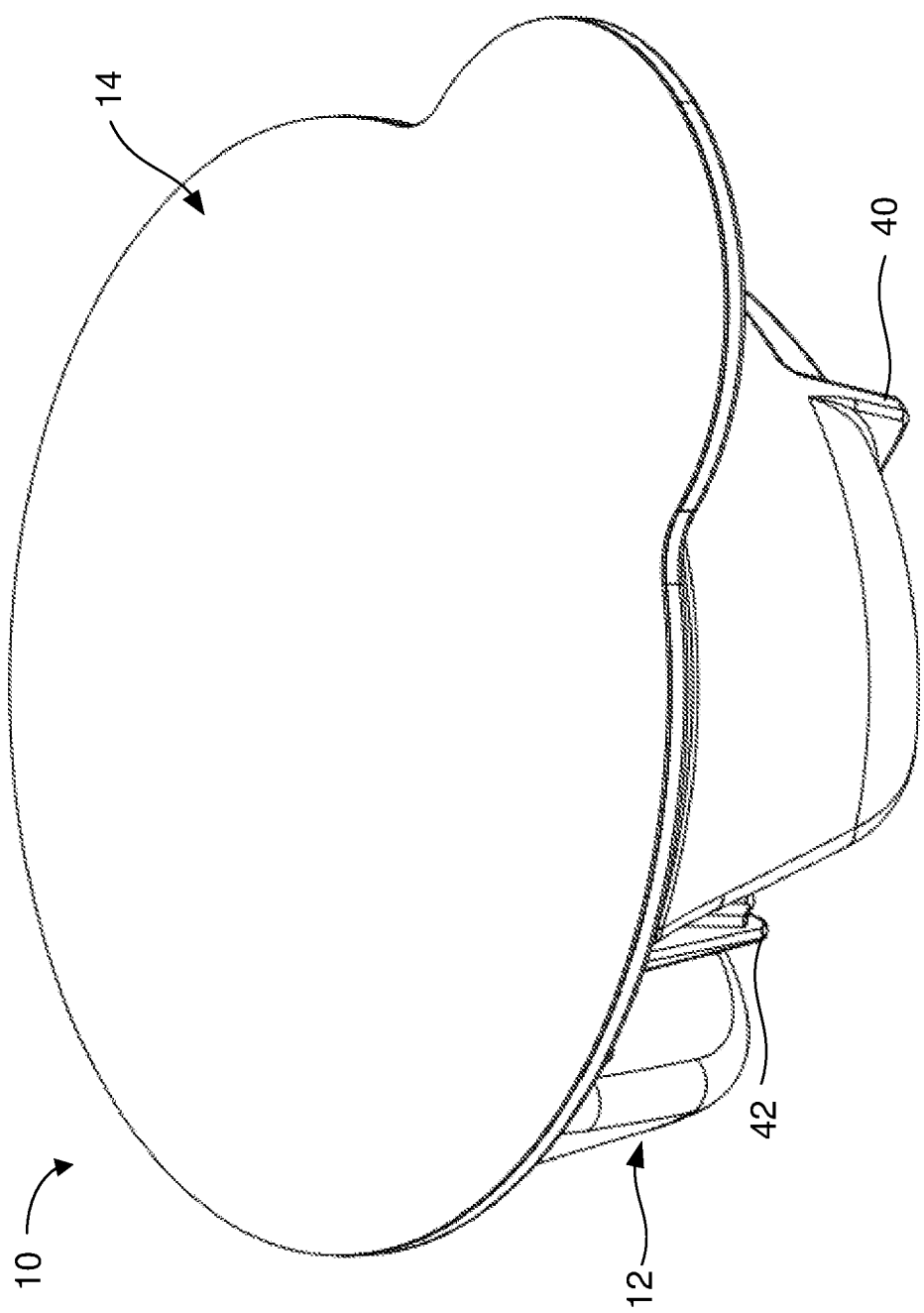
FIG. 7 is a perspective view of a capsule for use with the beverage machine of FIG. 1 in accordance with a non-limiting embodiment of the disclosure.

Attention is now directed to FIG. 7, which shows a perspective view of capsule 10. Capsule 10 includes lid 14 which is configured to seal the open top of shell 12. To seal the open top of shell 12, a liquid comprising one or more ingredients is placed into reservoir 24 and lid 14 is placed on peripheral rim 22 and flange 23 of shell 12. A bottom surface of lid 14 is fastened to peripheral rim 22 and flange 23 and using, for example, any suitable adhesive, to seal the liquid ingredients (not shown) inside reservoir 24 of capsule 10 and to inhibit the liquid in reservoir 24 from escaping from reservoir 24 of capsule 10. A barcode (not shown) that includes a recipe for a mixed beverage to be prepared by machine 100 using capsule 10 can be printed onto lid 14 of capsule 10.

Figure 8:
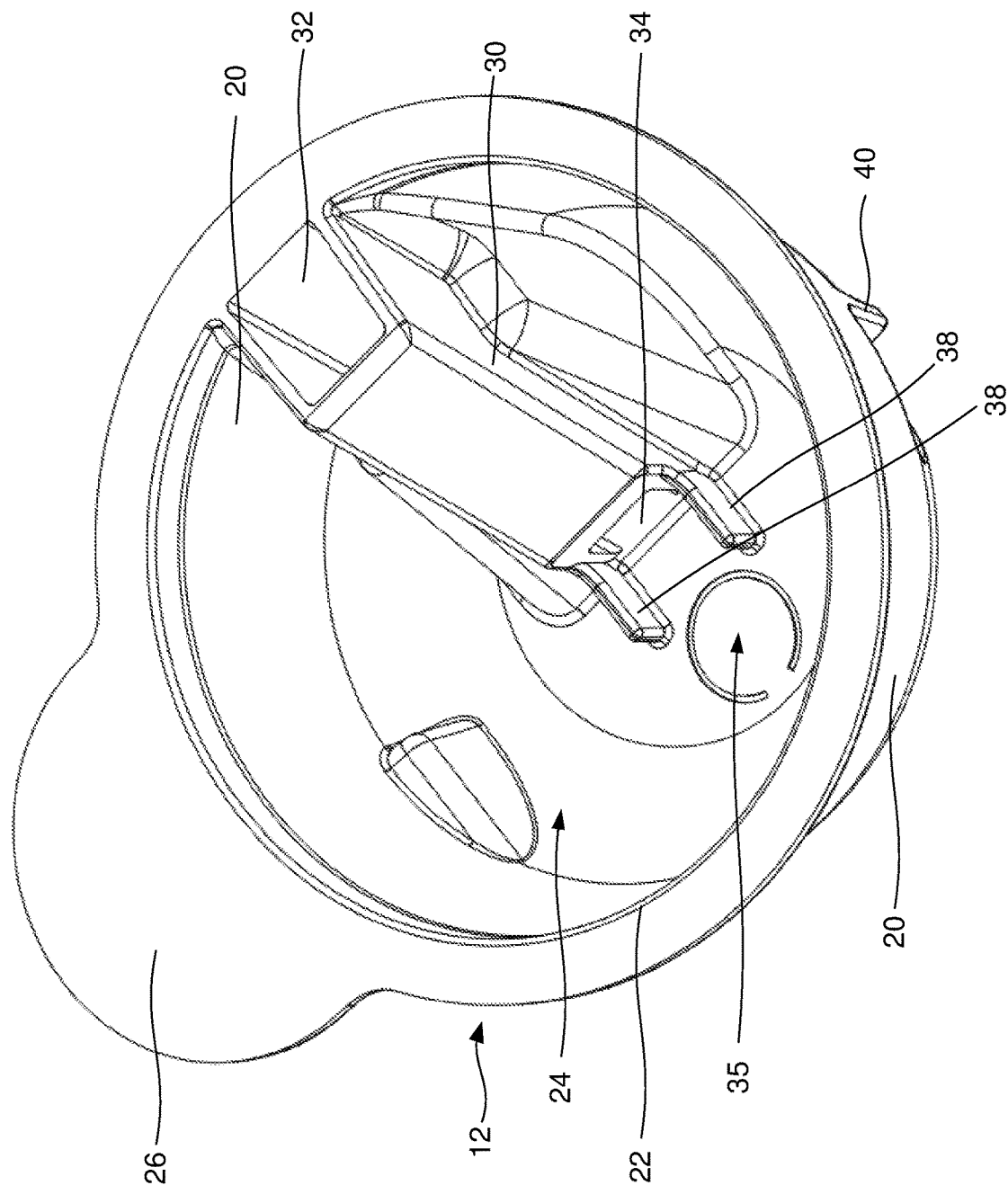
FIG. 8 is a top perspective view of the beverage capsule of FIG. 7, with a lid of the capsule of FIG. 7 removed.

Attention is now directed to FIG. 8, which depict capsule 10 without lid 14. Shell 12 includes a guide member configured to receive a liquid stream injected by injection needle 112 and guide or direct the liquid stream towards a mixing zone within reservoir 24 for mixing the liquid stream with the liquid comprising one or more ingredients held in the reservoir to prepare a single serving of a mixed beverage for dispensing from the reservoir via dispensing needle 114 of 100 machine when the open shell 12 is pierced by dispensing needle 114, as described in further detail below. In the example embodiment shown in FIG. 7 to FIG. 11, guide member comprises a channel 30 disposed within reservoir 24. Channel 30 includes an inlet 32 (see FIG. 4) shaped and dimensioned to receive a liquid stream from injection needle 112 of machine 100. Channel 30 also includes an outlet 34 for guiding or directing a liquid stream received from injection needle 112 towards mixing zone 35 within the reservoir 24 (see FIG. 4). In the example embodiment shown in FIGS. 7 to 11, channel 30 extends from proximate the peripheral rim 22 to an inner surface of bottom 18 of shell 12. Inlet 32 of channel 30 can be radially offset from the outlet 34 of channel 30. Channel 30 can follow the slope of the sidewall 20 of shell 12. Inlet 32 of channel 30 can be wider than outlet 34 of channel 30 (see FIG. 10) to increase a velocity of the flow of a liquid stream flowing through channel 30 from inlet 32 to outlet 34 of channel 30. In other embodiments, inlet 32 of channel 30 can be narrower than outlet 34 of channel 30. In still other embodiments, inlet 32 of channel 30 and outlet 34 of channel can have the same width. Channel 30 can also be a closed channel to increase the flow of a liquid stream through channel 30. Guide member also includes a pair of spaced apart vanes 38 disposed adjacent outlet 34 of channel 30 to improve mixing of the liquid stream and the liquid comprising one or more ingredients (e.g. "the liquid ingredients) in reservoir 24 to provide a single serving of a mixed beverage as described in further detail below.

It will be appreciated that although the guide member shown in the embodiment shown in FIG. 7 to FIG. 11 includes channel 30 and vanes 38, in other embodiments the guide member may be any suitable structure that guides or directs a liquid stream received from injection needle 112 to mixing zone 35 in reservoir 24.

Figure 9:
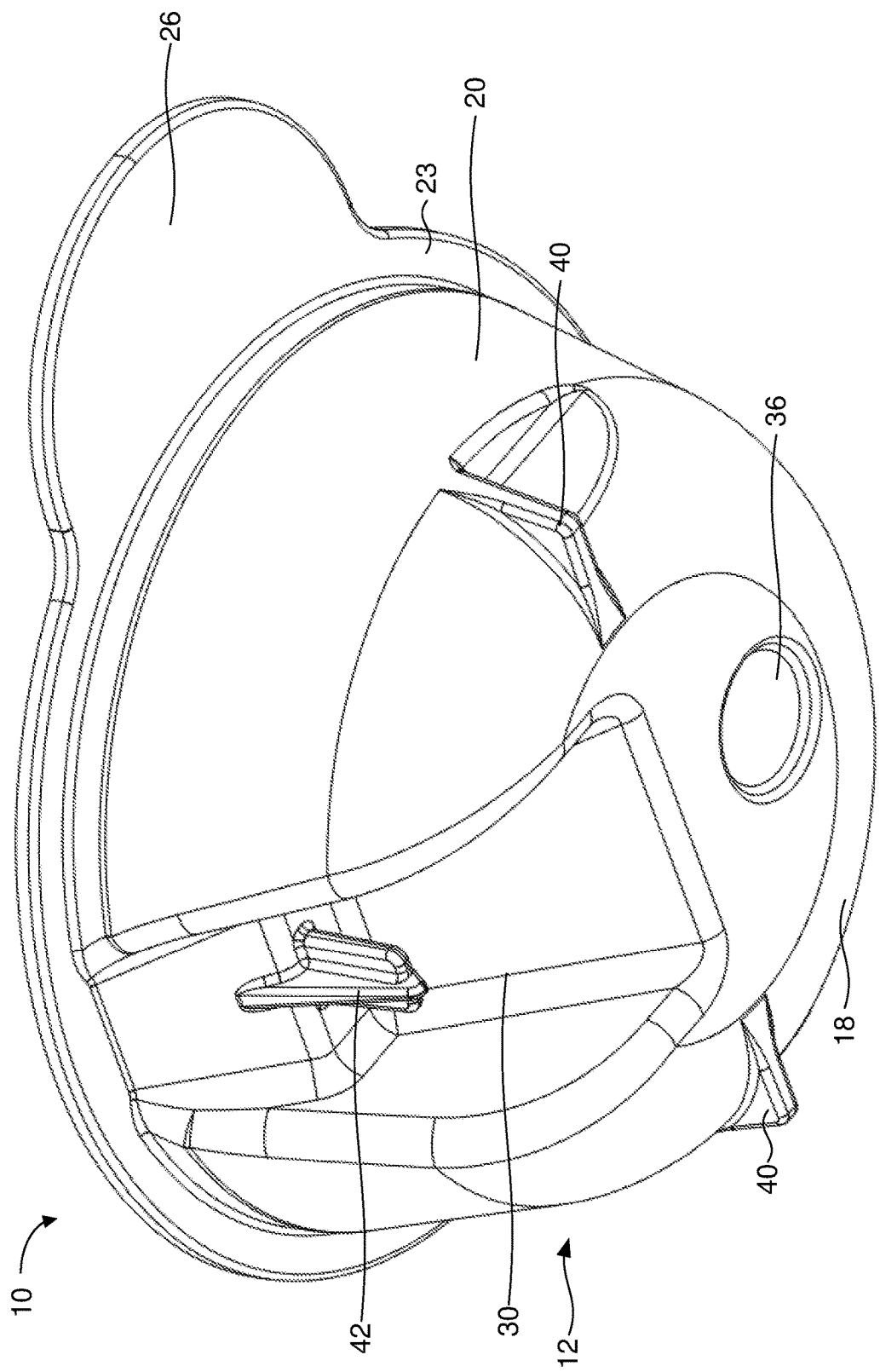
FIG. 9 is a bottom perspective view of the beverage capsule of FIG. 7.
Figure 10:
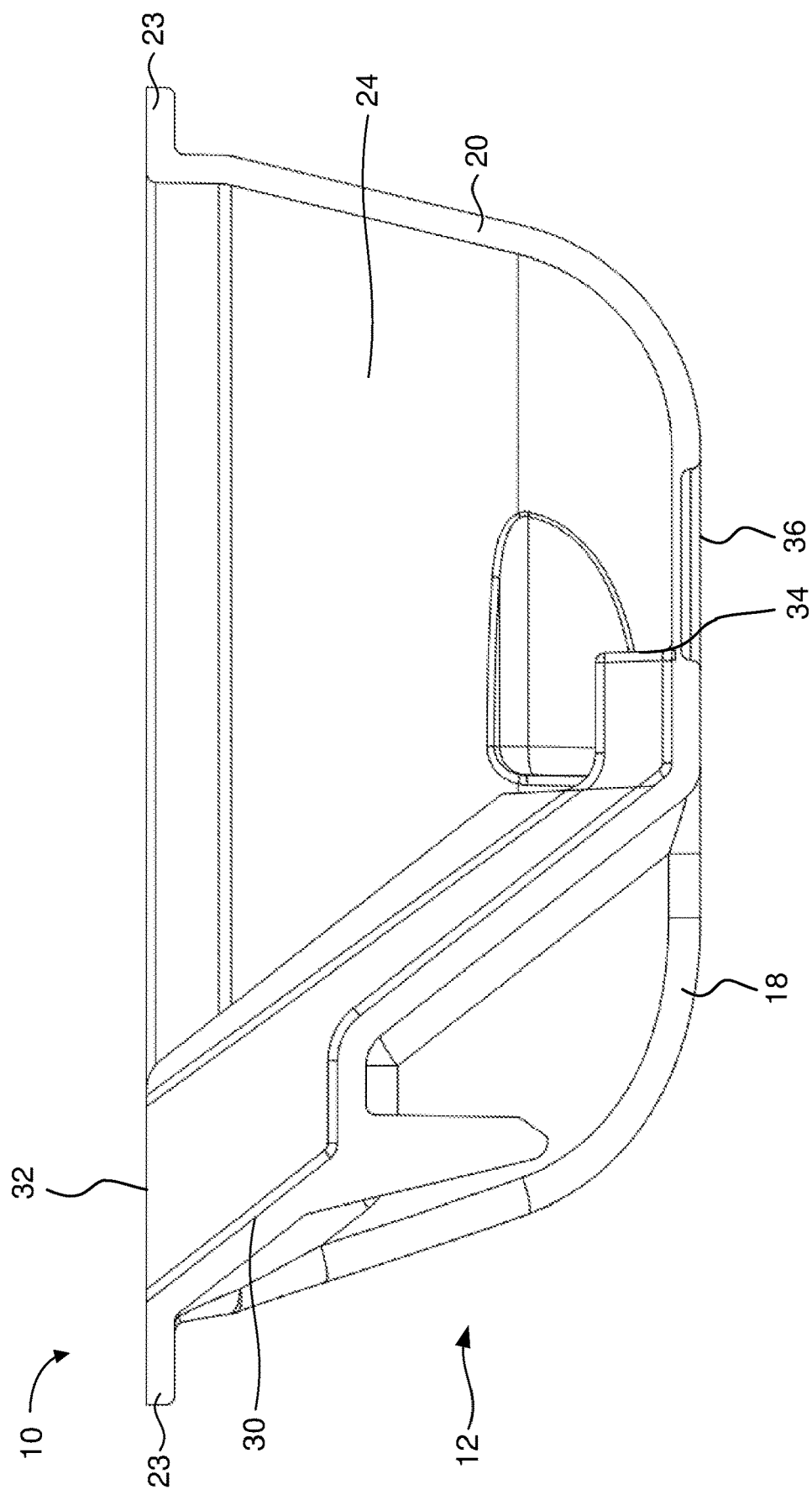
FIG. 10 is a partially cut-away side view of the beverage pod of FIG. 7.

Attention is now directed to FIG. 9, which depicts a perspective view of capsule 10 from below. As shown in FIG. 9, bottom 18 of shell 12 includes a weakened portion 36 for facilitating piercing of bottom 18 by dispensing needle 114 of machine 100. Weakened portion 36 is located adjacent mixing zone 35. Weakened portion 36 may be weakened by reducing thickness of bottom 18 at weakened portion 36 to less than a thickness of the remainder of bottom 18 or by scoring weakened portion 36. Outlet 34 of channel 30 is disposed adjacent weakened portion 36 (see FIG. 8). In some alternative embodiments, weakened portion 36 may be omitted and bottom 18 of shell 12 and bottom 18 of shell 12 may be made of a material that is pierceable by dispensing needle 114 of machine 100 such that liquid from reservoir 24 flows into the aperture 160 (see FIG. 6) of dispensing needle 114.

Figure 6:
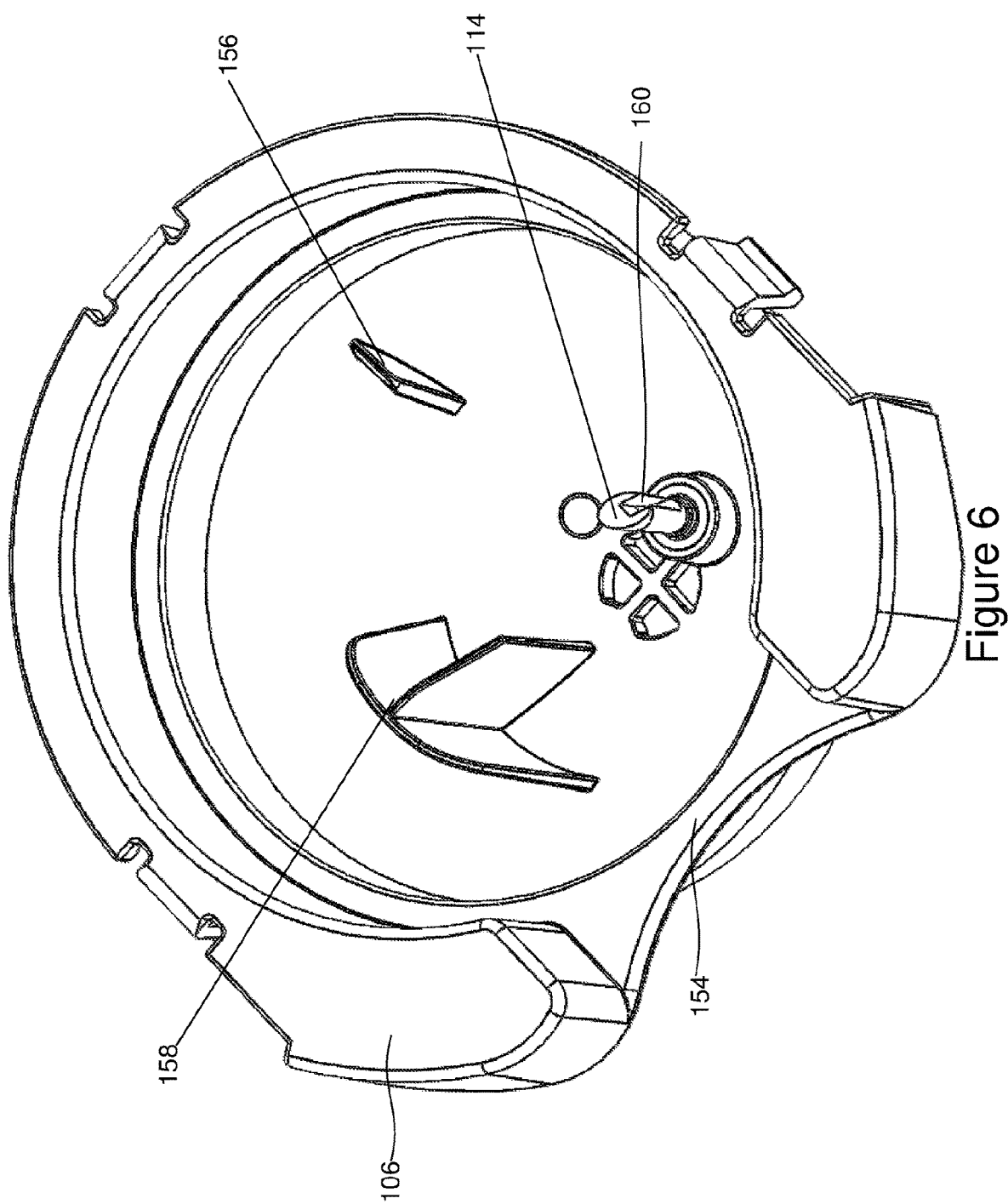
FIG. 6 is a perspective view of a beverage capsule receptacle of the beverage machine of FIG. 1 in isolation.

Attention is now directed to FIG. 6 and FIG. 9, which show beverage capsule receptacle 106 and bottom 18 of capsule 10. Bottom 18 of capsule includes locating members for correctly locating the inlet 32 relative to injection needle 112 when capsule 10 is inserted or placed into beverage capsule receptacle 106. Locating members are also configured to inhibit tilting of capsule 10 within beverage capsule receptacle 106 when beverage capsule receptacle 106 is disposed within beverage capsule receptacle 106 and pierced by injection needle 112. In the embodiment of capsule 10 shown in FIG. 7 to FIG. 11, the locating members comprise a pair of diametrically opposed fins 40 (see FIG. 9). Each fin 40 mates with a corresponding peg 156 of beverage capsule receptacle 106 (see FIG. 6). Outer surface of channel 30 also includes a peg 42. Peg 42 is configured to mate with a corresponding member 158 of beverage capsule receptacle 106. Tab 26, fins 40 and peg 42 of capsule 10 ensure that capsule 10 is orientated correctly within beverage capsule receptacle 106 and the inlet 32 of channel aligns with injection needle 112 when capsule 10 is disposed within beverage capsule receptacle 106. Peg 42 is also configured to facilitate nesting of multiple capsules 10 when lid 14 of capsule 10 is removed.

It will be appreciated that although capsule 10 shown in FIG. 7 to FIG. 11 includes a pair of diametrically opposed fins 40, in alternative embodiments, bottom 18 may include any suitable number of fins 40 that may be received within a corresponding number of slots (see FIG. 6) within beverage capsule receptacle 106. For example, bottom 18 may include three fins 40 or two pairs of diametrically opposed fins 40. Also, in some embodiments, peg 42 may be omitted from capsule 10.

Figure 11:
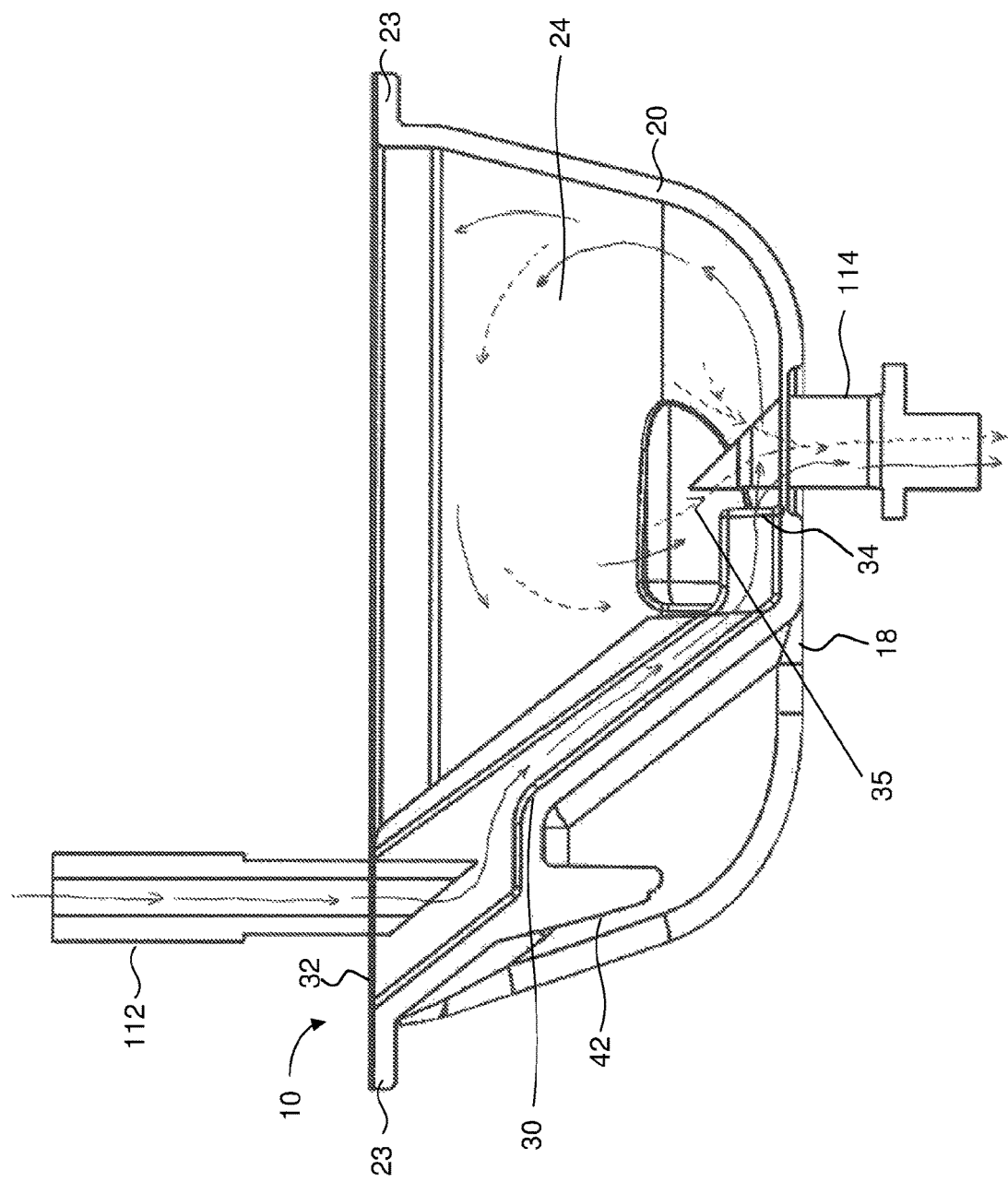
FIG. 11 is a partially cut-away side view of the beverage capsule of FIG. 7, with the injection needle and the dispensing needle of the beverage machine of FIG. 1 shown.

Attention is now directed to FIG. 11 to describe the preparation of a single severing of mixed beverage using capsule 10. In FIG. 11, the liquid stream is depicted using solid lines and the liquid ingredients (e.g. the liquid comprising one more ingredients that is within reservoir 24) is depicted in using dashed lines. In FIG. 11, lid 14 of capsule 10 has been pierced by injection needle 112 and injection needle 112 is positioned with inlet 32 of channel 30. Dispensing needle 114 has also pierced weakened portion 36 of bottom 18 of capsule 10. To prepare a single serving of a mixed beverage, the guide member (e.g. inlet 32 of channel 30) receives the liquid stream injected by injection needle 112. The liquid stream flows through channel and exits outlet 34 of channel 30. Outlet 34 and vanes 38 guide or direct the liquid stream into mixing zone 35 of reservoir 24. As the liquid stream is guided or directed into the mixing zone 35, a fraction of the liquid stream is dispensed directly through the aperture 160 (see FIG. 6) of dispensing needle 114 and into the beverage container (not shown) that is placed on platform 134 of base 102 of machine 100 directly below the beverage capsule receptacle 106. The remainder of the liquid stream of the liquid stream mixes back up into the reservoir 24 in a vortex of flow pattern to further mix with the liquid ingredients within reservoir 24, as shown in FIG. 11, and is thereafter dispensed through the aperture 160 (see FIG. 6) of dispensing needle 114. The vanes 38 of capsule 10 improve mixing of the liquid stream with the liquid comprising one or more ingredients (e.g. the liquid ingredients) within reservoir 24 when machine 100 is preparing a single serving of a mixed beverage. Vanes 38 are also configured to guide or direct the liquid stream such that the vortex or flow pattern created in reservoir cleans liquid from corners of shell 12.

Figure 12:
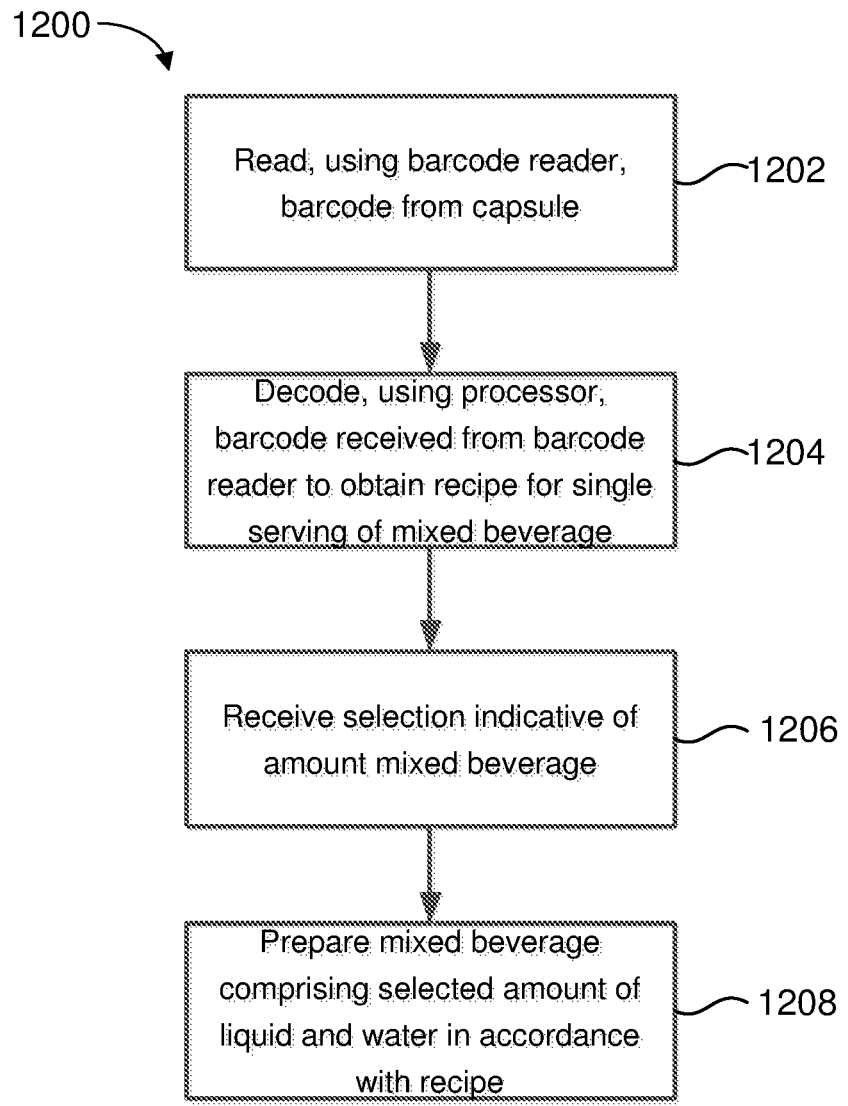
FIG. 12 is a flowchart depicting a method of operation of the beverage machine of FIG. 1 in accordance with a non-limiting embodiment of the disclosure.

Attention is now directed to FIG. 12, which depicts a method 1200 of operating machine 100 to prepare a single serving of a mixed beverage, such as, for example, a mixed alcoholic beverage. Method 1200 is carried out by software program, application, or firmware 132 executed, for example, by processor 116 of machine 100. Coding of software program, application, or firmware 132 for carrying out method 1200 is within the scope of a person of ordinary skill in the art given the present disclosure. Computer-readable code executable by processor 116 of machine 100 to perform method 1200 may be stored in a computer-readable storage medium, device, or apparatus, such as a non-transitory computer-readable medium.

It is to be emphasized, that method 1200 need not be performed in the exact sequence as shown, unless otherwise indicated; and likewise, various blocks may be performed in parallel rather than in sequence; hence the elements of method 1200 are referred to herein as "blocks" rather than "steps".

In the present disclosure, machine 100 makes a mixed beverage using a recipe that is encoded in a barcode. Each barcode includes or encodes a unique recipe that corresponds to a mixed beverage. In some embodiments, the barcode includes a recipe for a mixed alcoholic beverage. Examples of mixed alcoholic beverages include but are not limited to a cosmopolitan, a Manhattan, a *martini*, an old fashion, and the like. Each capsule 10 holds a liquid comprising one or more ingredients in reservoir 24 that are required to prepare a single serving of a mixed beverage using the recipe included in the barcode. The recipe in the barcode indicates to processor 116 which liquids are used to prepare the mixed beverage, an amount of each liquid to be used to prepare the mixed beverage (e.g. a volume of liquid to be used to prepare the mixed beverage), an amount of water to be used to prepare the mixed beverage (e.g. a volume of water to be used to prepare the mixed beverage). Optionally, the recipe also indicates which beverage container (e.g. glass) should be placed under beverage capsule receptacle 106 for receiving the mixed beverage and whether ice should be added to the beverage container (e.g. glass). The recipe can also include a name of the mixed beverage being prepared and a cleanout cycle to be used by machine 100 to clean or purge plumbing system 124 once a single severing of the mixed beverage has been prepared using capsule 10.

For the purposes of explanation of the operation of machine 100, it is assumed that machine 100 is used to prepare a mixed alcoholic beverage. Container 104-1 includes gin, container 104-2 includes vodka, container 104-3 includes tequila, and container 104-4 includes rum. It is also assumed that capsule 10 include a barcode that includes a recipe for preparing a single serving of a cosmopolitan (e.g. a mixed alcoholic beverage).

Method 1200 begins at block 1202 when a capsule 10 is placed within beverage capsule receptacle 106 and processor 116 of machine 100 detects that machine lid 107 has been closed. At block 1202, barcode reader 120 of machine 100 reads the barcode printed on lid 14 of capsule 10, and sends barcode data read from the barcode to processor 116 for decoding. Method 1200 then proceeds to block 1204.

At block 1204, processor 116 receives the barcode from barcode reader 120 data and decodes the barcode data to obtain a recipe for a single serving of a mixed beverage to be prepared by machine 100. In the present example, the barcode includes the recipe for preparing a single severing of a cosmopolitan. Method 1200 then proceeds to block 1206.

At block 1206, processor 116 detects selection of one of the four selectable options rendered on display 122 of machine 100. In response to detecting selection of one of and processor 116, method 1200 proceeds to block 1208 where machine 100 prepares a single severing of a mixed beverage that includes the selected amount of alcohol in accordance with the recipe. In the present example, it is assumed that the selection of the selectable option labelled "regular" is selected.

To prepare a single serving of a cosmopolitan, injection needle 112 of machine 100 pierces lid 14 of capsule 10 and aligns with the guide member of capsule 10 such that guide member receives a liquid stream injected by injection needle 112 and guides or directs the liquid stream towards mixing zone 35 in capsule 10. In some embodiments, injection needle 112 enters inlet 32 of channel 30 such that inlet 32 of channel 30 receives a liquid stream injected by injection needle 112 and guides or directs the liquid stream towards mixing zone 35 in capsule 10. Dispensing needle 114 of machine 100 also pierces weakened portion 36 of the capsule 10 and enters reservoir 24 of capsule 10 proximate mixing zone 35.

After injection needle 112 pierces lid 14 of capsule 10 and dispensing needle 114 weakened portion 36 of capsule 10, processor 116 communicates with plumbing system 124 to open valve 136, close valve 138, close valve 140, close valve 142, close air inlet valve 150, and close water valve 152. Processor 116 then turns on pump 128, which causes plumbing system 124 to provide a liquid stream comprising vodka from container 104-2 via the 4-way connectors 144, 146, and 3-way connector 148 to injection needle 112 via flow rate sensor 126 and pump 128. Flow rate sensor 126 obtains a measurement of an amount of the liquid stream comprising vodka that is injected into injection needle 112 and sends the measurement to processor 116. When processor 116 determines that the measurement received from flow rate sensor 126 is equal to one and a half ounces, processor 116 communicates with plumbing system 124 to close valve 136, and open water valve 152. A liquid stream comprising water is then pumped from water container 108 pump 128 via the 4-way connectors 144, 146, and 3-way connector 148 to injection needle 112 via flow rate sensor 126 and pump 128. Flow rate sensor 126 obtains a measurement of an amount of the liquid stream comprising water that is injected into injection needle 112 and sends the measurement to processor 116. When processor 116 determines that the measurement received from flow rate sensor 126 is equal to the amount of water specified in the recipe read from the barcode printed on capsule 10, processor 116 communicates with plumbing system 124 to water valve 152.

Optionally, processor 116 communicates with plumbing system 124 to open air inlet valve 150 to air from 4-way connector 144 and 3-way connector 148 and the lines that connect these connectors to minimize cross contamination of alcohol when machine 100 prepare another single severing of a mixed beverage.

In some embodiments, the liquid stream comprising alcohol and water is introduced into inlet 32 of channel 30 by injection needle 112 such that the liquid stream flows through channel 30. The liquid stream exits channel 30 via outlet 34 of channel 30 and is guided by vanes 38 around dispensing needle 114, which has pierced weakened portion 36. As the liquid stream flows through channel 30, a fraction of the liquid stream is dispensed directly through the aperture 160 (see FIG. 6) of dispensing needle 114 and into the beverage container (not shown) that is placed on platform 134 of base 102 of machine 100 directly below the beverage capsule receptacle 106. The remainder of the liquid stream is guided into the mixing zone 35 to mix with the liquid comprising one or more ingredients in reservoir 24. The remainder of the liquid stream mixes back up into the reservoir 24 in a vortex pattern to further mix with the liquid ingredients within reservoir 24 and is thereafter dispensed through the aperture 160 (see FIG. 6) of dispensing needle 114. The vanes 38 of capsule 10 improve mixing of the liquid stream with the liquid comprising one or more ingredients (e.g. the liquid ingredients) within reservoir 24 when machine 100 is preparing a single serving of a mixed beverage.

It will be appreciated that although the injection needle 112 and dispensing needle 114 pierce lid 14 and weakened portion 36 at different times in method 1200, in alterative embodiments of method 1200, injection needle 112 can pierce lid 14 and dispensing needle 114 can pierce weakened portion 36 in bottom 18 of shell 12 simultaneously. For example, injection needle 112 can pierce lid 14 first and dispensing needle 114 can pierce weakened portion 36 after injection needle 112 pierces lid 14. Alternatively, dispensing needle 114 can pierce weakened portion 36 first and injection needle 112 can pierce lid 14 after dispensing needle 114 pierces weakened portion 36.

It will further be appreciated that the shape and diameter of channel 30 and the flow rate of the liquid stream injected by injection needle 112 impact the amount of liquid stream that is dispensed directly into the beverage container via the aperture 160 (see FIG. 6) of dispensing needle 114.

Figure 13:
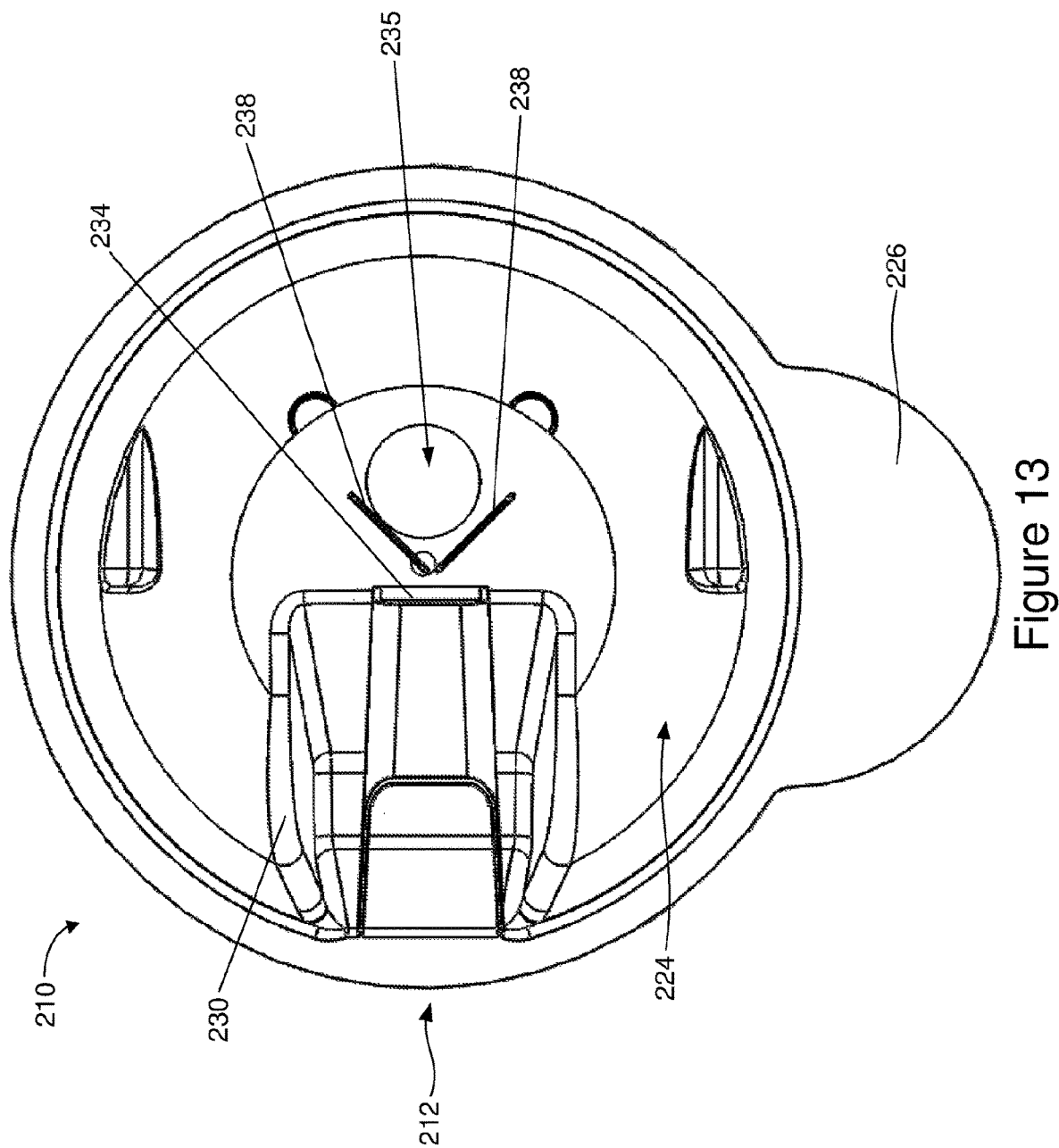
FIG. 13 is a top view of a capsule for use with the beverage machine of FIG. 1 in accordance with another non-limiting embodiment of the disclosure.

Attention is now directed to FIGS. 13 and 14, which depict a capsule 210 for use with machine 100 in accordance with another non-limiting embodiment. Capsule 210 is similar to capsule 10, with similar elements having similar numbers, however in a "200" series rather than a "10" series, except when otherwise indicated; this convention will be used throughout the present disclosure.

In the example embodiment depicted in FIGS. 13 and 14, the guide member of capsule 210 includes vanes 238 disposed proximate outlet 234 of channel 300. Vanes 238 are V-shaped to guide or deflect the liquid stream that exits from outlet 234 of channel 230 into mixing zone 235 such that the liquid stream flows past the dispensing needle 114, around dispensing needle 114, and a back into aperture 160 (see FIG. 6) of dispensing needle 114 for dispensing the mixed beverage from reservoir 24. In addition to guiding or deflecting the liquid stream to mixing zone 235 to flow past dispensing needle 114, vanes 238 are shaped and dimensioned to create a vortex or flow pattern for the liquid stream that cleans out liquid from corners of shell 212.

In the example embodiment depicted in FIGS. 13 and 14, a portion 202 of bottom 218 of reservoir 224 include support ribs 204 configured to reinforce portion 202 of bottom 218 of capsule 210 to inhibit bending of capsule 10 when capsule 210 is disposed within beverage capsule receptacle 106 of machine 100 and pierced by dispensing needle 114.

Optionally, channel 230 of capsule 200 includes a small aperture disposed proximate inlet 232 of channel 230. The aperture acts as an air relief when air inlet valve 150 of machine 100 is opened to purge the lines and connectors (e.g. 4-way connector 144 and 3-way connector 148) of machine 100. Air, with its lower viscosity and compressible nature escape through the small aperture (e.g., the air relief opening), while inhibiting the mixed beverage from escaping through the small aperture. The air relief opening inhibits air from travelling down channel 230 and bubbling back up to the top of reservoir 224, which would cause liquid ingredients located within reservoir 224 to foam and would result is an unattractive beverage aesthetic quality.

Machine 100 and capsules 10, 210 of the present disclosure are used to prepare a single serving of mixed beverage that is evenly dispensed from machine 100 via dispensing needle 114 into a beverage container (not shown) such that the mixed beverage prepared using machine 100 and capsule 10 does not include any layering of liquids in the mixed beverage (e.g. no difference in color between the different liquids in the mixed beverage).

Those skilled in the art will appreciate that in some embodiments, the functionality of machine 100 can be implemented using pre-programmed hardware or firmware elements (e.g., application specific integrated circuits (ASICs), electrically erasable programmable read-only memories (EEPROMs), etc.), or other related components. In other implementations, the functionality of machine 100 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

The terms top, bottom, and horizontal are utilized herein to provide reference to the orientation of the capsule when disposed in beverage capsule receptacle 106, as shown in FIG. 1.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative embodiments and modifications possible, and that the above examples are only illustrations of one or more implementations. The scope, therefore, is only to be limited by the claims appended hereto.

We claim:

1. A capsule for use in a beverage machine, the capsule comprising:
    an open shell defining a reservoir for holding a liquid comprising one or more ingredients, the reservoir including a mixing zone adjacent to an inner surface of a closed bottom of the open shell;
    a lid for sealing an open top of the open shell; and,
    a guide member disposed within the reservoir of the open shell, the guide member comprising a channel, the channel comprising:
        an inlet adjacent to the open top, configured to receive a liquid stream injected by an injection needle of a beverage machine when the lid is pierced by the injection needle; and
        an outlet adjacent to the mixing zone, at least part of the outlet defined by the inner surface of the closed bottom of the open shell;
    the guide member configured to guide the liquid stream to the mixing zone for mixing the liquid stream with the liquid held in the reservoir to prepare a single serving of mixed beverage to be dispensed from the reservoir via a dispensing needle of the beverage machine when the dispensing needle pierces the open shell.

2. The capsule of claim 1, wherein the guide member further comprises one or more vanes adjacent to the outlet for guiding the liquid stream toward the mixing zone within the reservoir.

3. The capsule of claim 1, wherein the channel is a closed channel.

4. The capsule of claim 1, wherein the open shell comprises a sidewall and the channel follows a slope of the sidewall.

5. The capsule of claim 1, wherein the inlet and the outlet of the channel are radially offset.

6. The capsule of claim 1, wherein the inlet of the channel has a first width and the outlet has a second width less than the first width to increase a velocity of a flow of the liquid stream through channel.

7. The capsule of claim 1, wherein the channel comprises an air relief aperture proximate the inlet of the channel.

8. The capsule of claim 1, wherein an outer surface of the closed bottom of the open shell comprises locating members for locating the inlet of the channel relative to injection needle when the capsule inserted into a beverage capsule receptacle of the beverage machine.

9. The capsule of claim 8, wherein the locating members comprise a pair of diametrically opposed fins for locating the inlet of the channel relative to injection needle when the capsule is inserted into the beverage capsule receptacle of the beverage machine.

10. The capsule of claim 1, wherein the open shell has a generally concave geometry for nesting the capsule within another capsule.

11. The capsule of claim 1, wherein the open shell is manufactured from a recyclable material.

12. The capsule of claim 11, wherein the recyclable material is selected from a member of the group consisting of polyethylene, polyethylene terephthalate (PET), polypropylene (PP), polystyrene (PS), and aluminum.

13. The capsule of claim 1, wherein the closed bottom of the shell comprises a weakened portion located at the mixing zone, the weakened portion pierceable by the dispensing needle of the beverage machine.

14. The capsule of claim 13, wherein the weakened portion is scored to facilitate piercing by the dispensing needle of the beverage machine.

15. The capsule of claim 13, wherein the weakened portion has a thickness less than a thickness of the closed bottom of the open shell to facilitate piercing by the dispensing needle of the beverage machine.

16. A beverage machine for preparing a single serving of a mixed beverage, the beverage machine comprising:
    one or more containers, each container configured to hold a liquid;
    a water container configured to hold water;
    a plumbing system configured to provide a liquid stream comprising liquid from at least one of the one or more containers and water from the water container to the injection needle;
    a beverage capsule receptacle configured to receive and retain a capsule of claim 1;
    an injection needle for piecing the lid of the capsule and for injecting the liquid stream into the beverage capsule for preparing the single serving of the mixed beverage; and,
    a dispensing needle for piercing the closed bottom of the capsule to dispense the mixed beverage from the beverage capsule.

17. The beverage machine as claimed in claim 16, further comprising:
    a flow rate sensor configured to measure an amount of the liquid stream provided by the plumbing system.

* * * * *